US006746814B2

(12) United States Patent
Coe

(10) Patent No.: US 6,746,814 B2
(45) Date of Patent: Jun. 8, 2004

(54) METHOD AND SYSTEM FOR COLORIZING A STEREOLITHOGRAPHICALLY GENERATED MODEL

(76) Inventor: Dorsey D. Coe, 626 N. 17th St., Grand Junction, CO (US) 81501

( * ) Notice: Subject to any disclaimer, the term of this patent is extended or adjusted under 35 U.S.C. 154(b) by 100 days.

(21) Appl. No.: 09/960,257

(22) Filed: Sep. 21, 2001

(65) Prior Publication Data

US 2002/0086247 A1 Jul. 4, 2002

Related U.S. Application Data

(60) Provisional application No. 60/238,959, filed on Oct. 9, 2000.

(51) Int. Cl.[7] ................................................. G03F 7/26
(52) U.S. Cl. ...................... 430/269; 430/292; 264/401
(58) Field of Search ...................... 264/401; 430/269, 430/292

(56) References Cited

U.S. PATENT DOCUMENTS

| 5,330,799 A | 7/1994 | Sandor et al. ............... 427/510 |
| 5,514,519 A | 5/1996 | Neckers ........................ 430/269 |
| 5,783,712 A | 7/1998 | Steinmann et al. .......... 549/554 |
| 5,932,309 A | 8/1999 | Smith et al. .................... 428/46 |
| 6,007,318 A | 12/1999 | Russell et al. ............... 425/130 |
| 6,036,910 A | 3/2000 | Tamura et al. ............... 264/401 |
| 6,074,742 A | 6/2000 | Smith et al. ................. 428/329 |
| 6,129,872 A | 10/2000 | Jang ............................. 264/75 |
| 6,165,406 A | 12/2000 | Jang et al. ................... 264/308 |

FOREIGN PATENT DOCUMENTS

| WO | WO 97/09168 A1 | 3/1997 | ........... B29C/67/00 |

OTHER PUBLICATIONS

L. McLean, "Technicolor dream models", [Internet], URL:http://www.manufacturing.net/dn/index.asp?layout=articleWebzine&articleid=CA107865, 1 p., Jul. 17, 2000.

N. Petillon et al., "Color Stereophotolithography: A Method of 3–D Color Imaging", *Journal of Imaging Science and Technology*, vol. 40, No. 1, pp. 48–55 (published on the front page of the abstract), or pp. 42–49 (handwritten on the front page of document), Jan./Feb. 1996.

P. Jacobs, *Stereo Lithography And Other RP& M Technologies*, ASME book No. 800431, Society of Manufacturing Engineers, pp. 54–55, 1996.

"Reverse Engineering & Inspection–Special Focus", *Time–Compression Technologies*, vol. 9, Issue 2, unidentified page, Apr. 2001.

*Primary Examiner*—Cynthia Hamilton
(74) *Attorney, Agent, or Firm*—Sierra Patent Group, Ltd.

(57) ABSTRACT

A method for providing color to a stereolithographically produced model is disclosed. This method comprises obtaining data representing the model, such that the data is readable by a stereolithographic model generating machine for solidifying layers of a liquid resin in a vat creating resin layers to create successive cross sections of the model. Each of the resin layers are exposed with energy effective for solidifying the resin. One or more portions of at least one of the resin layers are overexposed with an energy according to a coloring or shading indicated in the data. The model is heated with an effective amount of heat to induce a color or shading change in substantially only the overexposed portions of the model. The model is removed from the vat and cleaned. Next, the model can be exposed to an energy source, followed by the finishing of the model.

44 Claims, 7 Drawing Sheets

Acrylate

Epoxy

Vinylether

METHOD AND SYSTEM FOR COLORIZING A STEREOLITHOGRAPHICALLY GENERATED MODEL

CROSS-REFERENCE TO RELATED APPLICATION

The present application claims the benefit of the date of U.S. Provisional Patent Application Serial No. 60/238,959, entitled "Method and System for Colorizing a Stereolithographically Generated Model", filed on Oct. 9, 2000, which is incorporated herein in its entirety.

BACKGROUND

The present application relates to providing visual of a model produced by stereolithographic techniques such as providing gray-scale and/or color detail to the model.

The term rapid prototyping (RP) refers to a class of technologies that can automatically construct physical models from Computer-Aided Design (CAD) data. These "three dimensional printers" allow designers to quickly create tangible prototypes of their designs, rather than just two-dimensional pictures. Such models have numerous uses. They make excellent visual aids for communicating ideas with co-workers or customers. In addition, prototypes can be used for design testing. For example, an aerospace engineer might mount such a model airfoil in a wind tunnel to measure lift and drag forces.

In addition to prototypes, RP techniques can also be used to make tooling (referred to as rapid tooling) and even production-quality parts (rapid manufacturing). For small production runs and complicated objects, rapid prototyping is often the best manufacturing process available. Of course, "rapid" is a relative term. Most prototypes require from three to seventy-two hours to build, depending on the size and complexity of the object.

Because RP technologies are being increasingly used in non-prototyping applications, the techniques are often collectively referred to as "solid free-form fabrication", "computer automated manufacturing", or "layered manufacturing." The latter term is particularly descriptive of the manufacturing process used in rapid prototyping commercial techniques, since a software package is used to "slice" the CAD model into a number of thin (e.g., approximately 0.1 mm to 0.7 mm) layers, which are then built up successively one on top of another. Thus, rapid prototyping is an "additive" process, combining layers of paper, wax, or plastic to create a solid object. In contrast, most machining processes (milling, drilling, grinding, etc.) are "subtractive" processes that remove material from a solid block. Accordingly, the additive nature of rapid prototyping allows the creation of objects with complicated internal features that cannot be manufactured by other means.

One of the most important rapid prototyping techniques is stereolithography (STL). In fact, stereolithography started the rapid prototyping revolution in the late 1980's. The STL technique builds three dimensional models from liquid photosensitive polymers that solidify when exposed to ultraviolet light. As illustrated in prior art FIG. 1, a model 20 is built upon a platform 22 situated just below the surface of a vat of, for example, liquid epoxy or acrylate resin. A low-power highly focused UV laser traces out the first layer, solidifying a cross section of the model while leaving the resin in a liquid state in those areas not identified as part of the "current" model cross section. As illustrated in FIG. 1, an elevator 24 incrementally lowers the platform 22 into the liquid polymer 26. A sweeper 28 re-coats the solidified current model layer with liquid resin from the vat 30, and the laser 32 (via lenses 34 and mirror 36) traces each next layer atop the previous layer. This process is repeated until the prototype model 20 is complete. Afterwards, the solidified model 20 is removed from the vat 30 and rinsed clean of excess liquid resin. Subsequently, supports may be broken off the model and the model is then placed in an ultraviolet oven (not shown) for complete curing.

In detail, stereolithography, as well as other rapid prototyping techniques, all employ the same basic five-step process. The steps are:

Step 1 Create a CAD data model of the design;

Step 2 Convert the CAD data model to a standard stereolithographic (STL) data format;

Step 3 Manipulate the STL file so that the model to be generated is in a desired orientation and has a desire resolution by "slicing" the model represented by the STL file into thin cross-sectional layers;

Step 4 Construct the model one layer atop another using a STL device; and

Step 5 Clean and finish the model.

Thus, the object (i.e., model) to be built is first modeled (in Step 1) using a computer-aided design (CAD) software package. Solid modeling CAD systems tend to represent three dimensional objects more accurately than wire-frame modelers, and will therefore tend to yield better results (i.e., a more accurate model). However, regardless of the CAD packages used, to establish consistency, the STL rapid prototyping industry has adopted a standard data format for inputting data to stereolithographic model generating devices. Accordingly, in Step 2, the CAD file output in Step 1 is converted into STL format. This format represents a three dimensional surface as an assembly of planar triangles, like the facets of a cut jewel. Thus, the standardized STL output file contains the coordinates of the vertices and the direction of the outward normal of each triangle. Because STL files use planar elements, they cannot represent curved surfaces exactly.

In Step 3, a pre-processing program prepares the STL file for use by a STL device for generating the desired model. Several programs are available for this purpose, and most allow the user to adjust the size, location and orientation of the model to be built. Build orientation is important for several reasons. First, properties of rapid prototypes vary from one coordinate direction to another. For example, prototypes are usually weaker and less accurate in the z (vertical) direction than in the x-y plane. In addition, part orientation partially determines the amount of time required to build the model. Placing the shortest dimension in the z direction reduces the number of layers, thereby shortening build time. Additionally, all such pre-processing programs generate slices of the STL model into a number of layers from 0.01 millimeters (mm) to 0.7 mm thick (in the z direction), depending on the build technique and the resolution desired. The preprocessing program may also generate an auxiliary structure to support the model during the build. Supports are useful for delicate features, such as overhangs, internal cavities, and thin-walled sections.

In Step 4, the actual construction of the model is performed. Using one of several techniques RP machines build one layer at a time from polymers, paper, or powdered metal. Most machines are fairly autonomous, needing little human intervention. Subsequently, the built model may be cured so that further hardening occurs.

Finally, in Step 5, post-processing finishing is performed. This step involves removing the prototype from the machine and detaching any supports. Some photosensitive materials need to be fully cured before use. Prototypes may also require minor cleaning and surface treatment. Sanding, sealing, and/or painting the model will improve its appearance and durability.

However, in using stereolithographic techniques to build such models, the techniques for providing shading and/or color to such models have been performed by:

a. Introducing an additive into the resin such as the chemical compounds referred to in U.S. Pat. No. 5,514, 519 to Neckers incorporated herein by reference. In particular, the following compounds have been added to such resins: carbon black, anthraquinone-based blue dyes, tetracyano uinodimethane, and photobleachable dyes such as: 1,3-dihydro-6',8'-dichloro-1-hexyl-3,3-dimethyl spiro>2H-indole-2,2'->3H!benzopyran! (SP1) and 1,3-dihydro 6'-nitro-8'-bromo-1-hexyl, 3,3-dimethyl spiro>2H-indole-2,2'->3H!benzopyran!. Moreover, such additives may not provide visual details of the model. In particular, such prior art colorizing techniques can not easily provide multiple shades of any color. Thus, for example, visual details that could be represented by gray scale shading are typically unavailable. Accordingly, the gray scale or color representation of the bone structure in the model of a hand such as in FIG. 2 has not been easily attained theretofore, or b. The application of a tremendous amount of laser energy to the resin (e.g., approximately 1000% of the critical energy required for resin solidification) for affecting the optical density of desired portions of the resulting STL model. In particular, the UV overcure selectively burns the solidified resin (i.e., oxidizes the resin) so that shading of the selected the portions of the model occurs immediately. Such a UV overcure technique also produces unwanted side effects including de-wetting or smoke that can accumulate in the model building chamber. Moreover, in at least one stereolithographic system having 3D Lightyear STL data model generating software by 3D Systems Inc. of Valencia, Calif., overcure values have been restricted such that the amount of laser energy required to adequately darken a model by such burning is not possible with standard build style STL data files.

Accordingly, it would be advantageous to have a system and method for selectively introducing shading and/or color variations in an STL model, wherein external and/or internal features of the model and/or indicia thereon are readily discernable. Furthermore, it would be advantageous that the system and method be cost effective and easily implemented (e.g., using existing STL technology) without requiring large amounts of energy and without producing unwanted side effects.

SUMMARY

The drawbacks and disadvantages of the prior art are overcome by the method and system for colorizing a stereolithographically generated model.

The present invention is a system for producing stereolithographic (STL) models, wherein shading and/or color variations can be provided in or on the model. In particular, the present invention provides more visual detail of a three dimensional object (i.e., model) wherein the surface or internal structures can be more readily discerned due to the intentional shading and/or colorizing of various portions of the model differently.

Moreover, the present invention is an enhancement to the current process of creating three dimensional geometries (e.g., models) using a STL apparatus. In particular, referring to the Steps 1 through 5 above, the present invention is an enhancement of at least Steps 1 and 4, and in some embodiments such enhancements may also be directed to Step 2. More particularly, Step 1 is modified by the method and system of the present invention in that colors and/or shades (e.g., grayscale) are provided in the CAD data model in a manner that allows such colors and/or shades to be converted into a data format that is usable by an STL machine to generate the corresponding STL model with the desired coloring and/or shading. It is an aspect of the present invention to provide a plurality of color data transfer techniques to perform such data conversions wherein colors and/or shades in the CAD data model are implemented in a solid resin model. Such color data transfer techniques will be described in detail hereinbelow.

Enhancements to Step 4 may be generally described as including the following sub-steps:

Step 4.1. The slices of three dimensional data (generated in Step 3) representing layers of the model are sequentially solidified from the liquid resin 26 by a laser 32 (as illustrated in FIG. 1) outputting sufficient ultra-violet wavelength and millijoule energy onto the surface of the liquid resin to thereby harden a thin layer of the resin at the surface. In particular, such solidification is typically by means of actinic radiation;

Step 4.2. The completed model is removed from the resin vat 30 and cleaned of excess uncured resin; and Step 4.3. The model is then exposed to additional ultra-violet light in an ultraviolet oven to further harden the model. Note that this step is required not only to further harden the model, but also because such resins in their non-solid state are typically toxic to humans and cannot be handled until completely hardened.

The improvement of the present invention adds shading and/or color to the outside and/or inside of a STL generated model by modifying Step 4.1 (or, adding a subsequent step) denoted Sub-step A below and adding a subsequent additional Sub-step B prior to Step 4.3, and more particularly between Steps 4.2 and 4.3. In particular, Sub-steps A and B are as follows:

Sub-step A. In addition to the irradiation of the resin 26 as described in Step 4.1 above for forming a layer of the model, additional laser radiation is provided to portions of the layer that is to be shaded and/or colored. The amount of additional energy (beyond what is necessary for solidifying the model) that is directed to the portions of the layer intended to be shaded and/or colorized is dependent upon the shade or color desired as well as a number of other factors such as the type of resin as well as other factors described herein below. However, the amount of additional energy beyond what is necessary for solidifying the model is in the range of 0.01% to 500%, and more particularly in the range of 10% to 100%. Further, the additional exposure to the laser radiation may not produce any visible shading in the model without subsequently performing Sub-step B following; and Sub-step B. The model is placed in an oven and heated to 70 to 90 degrees Celsius (° C.) from 30 minutes to 4 hours depending on various characteristics of the model (e.g., the type of resin used, the size of the model, and amount of laser energy overexposure in Sub-step A). It is during the Sub-step B that the portions of the model that received additional amounts of laser energy (i.e., overexposure or overcuring) in Sub-step A become shaded and/or colorized.

Accordingly, the present invention may be cost effectively implemented with readily available and/or currently used components in the stereolithography industry. Moreover, the ability to produce such shading and/or colorizing in STL models according to the present invention makes available new and novel model features including the ability to brand such models, provide indicia thereon, texture a model, simulate model finishing such as the appearance of paint, reproduce a photographic image applied to the inside, outside or both of such a model.

BRIEF DESCRIPTION OF THE DRAWINGS

Referring now to the figures, wherein like elements are numbered alike.

DETAILED DESCRIPTION

Those of ordinary skill in the art will realize that the following description of the present invention is illustrative only and not in any way limiting. Other embodiments of the invention will readily suggest themselves to such skilled persons.

The present invention changes the shade and/or color (the term "optical density" is used herein to also denote shade and/or color) of photopolymer resins according to:

(a) the amount of excess energy in the form of laser ultraviolet radiation that is given to the resin in excess of the amount needed to cure or harden the resin (or other photosensitive liquid material such as certain photopolymers) into solid form combined with length of time, and (b) the temperature of heat applied to the model after it has been built in an STL machine but before it undergoes additional UV Curing.

In one embodiment, the photopolymer resins utilized are based on an epoxy photopolymers, such that bonding and optical density reactions occur with the use of lasers that emit UV in the spectral range of 300 nanometers (nm) to 450 nm, with 325 nm to 375 nm preferred, and 340 nm to 360 nm more preferred. Other wavelengths are also within the scope of the present invention.

Moreover, various types of lasers may be used such as Helium-cadmium (He—Cd) and argon ion gas lasers. Additionally, the present invention has been successfully tested using the following STL machines: SLA-7000 and SLA-5000 machines manufactured that start in the infrared spectrum and then filter the output to the appropriate wavelength of UV.

Figure 1:
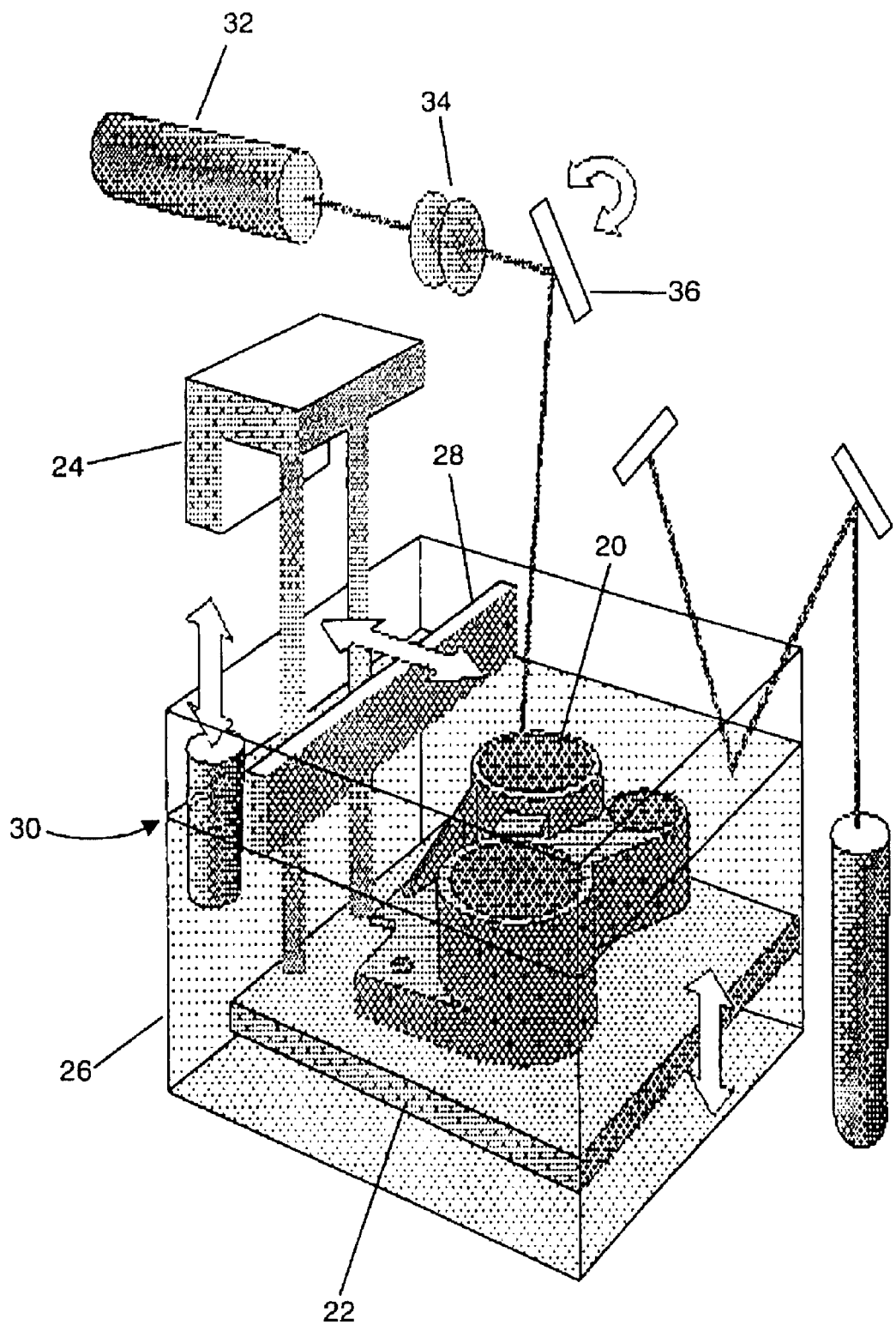
FIG. 1 illustrates a prior art stereolithographic machine during the process of building an STL model.
Figure 2:
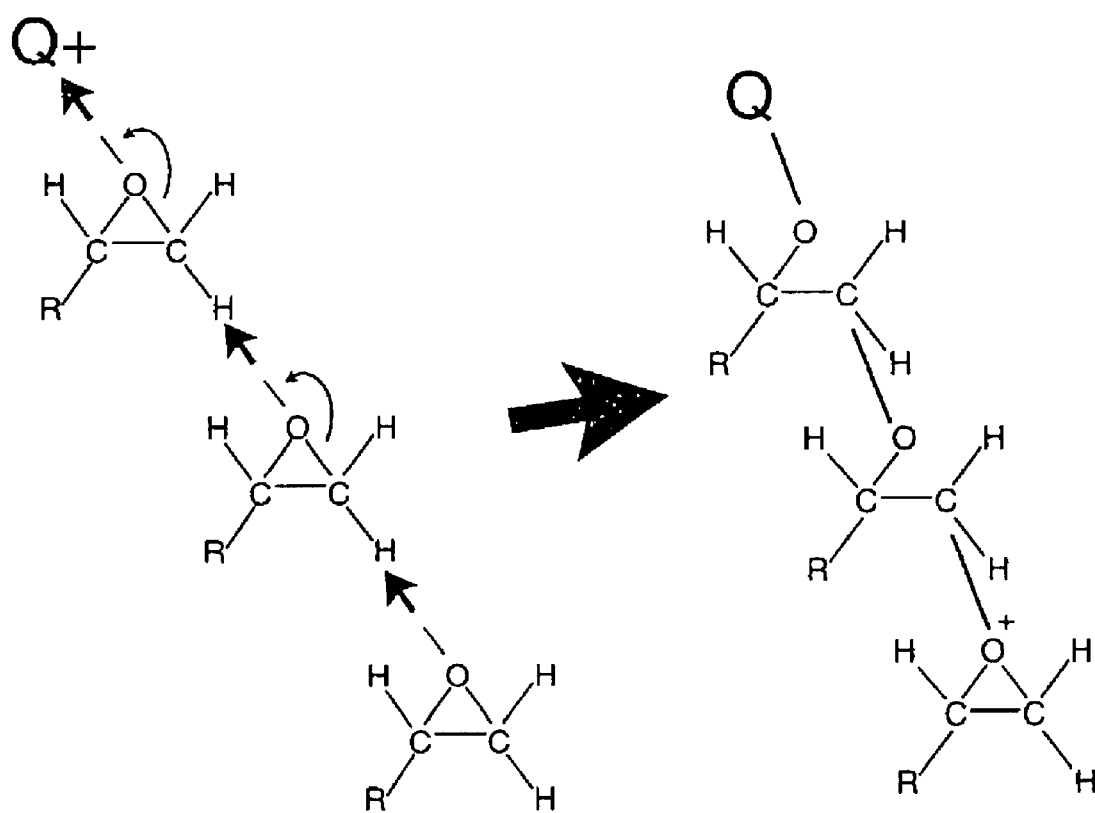
FIG. 2 is a simplified illustration of ring opening homopolymerization of epoxy monomers.

Various resins may be utilized in accordance with the present invention. For example, an epoxy photopolymer may be used which changes from liquid to solid by means of cationic photopolymerization. More precisely, prior to exposure by the laser radiation, the resin may be a liquid epoxy monomer that is transformed into a solid polymer by the laser radiation. Such epoxy monomers form polymers by undergoing ring-opening reactions in the presence of cationic photoinitiators as shown in FIG. 2. At least some epoxy resins that change in optical density according to the present invention are: SL7510, SL7520, SL7540, and SL5530HT originally manufactured by Ciba-Geigy Corporation in Los Angeles, Calif. The general chemical compositions of such resins are as follows:

(a) For SL7510:
(Chemical Family: Epoxy resin and acrylate ester blend) Alkyl Carbonate, concentration 0–10% by weight (wt); Acrylate Ester, concentration 0–10% by wt; Cycloaliphatic Glycidyl Ether, concentration 10–30% by wt; Epoxy Resin, concentration 10–30% by wt; Diacrylate Esters, concentration 0–10% by wt; Acrylate Esters, concentration 0–10% by wt; Aliphatic Polyol Polyglycidyl Ether, concentration 0–10% by wt; Cycloaliphatic Epoxide, concentration 30–60% by wt; and one or more Photoinitiators.

(b) For SL7520:
(Chemical Family: Epoxy resin and acrylate ester blend) Alkyl Carbonate, concentration 0–10% by wt; Acrylate Ester, concentration 0–10% by wt; Epoxy Resin, concentration 10–30% by wt; Diacrylate Esters, concentration 0–10% by wt; Acrylate Esters, concentration 0–10% by wt; one or more Phototinitiators having a concentration of approximately 0–30% by weight; one or more Cycloaliphatic Epoxides having a concentration of approximately 0–60% by weight; Polyester Polyol, concentration 0–10% by wt; and Acrylated Epoxy, concentration 0–10% by wt.

(c) For SL7540:
(Chemical Family: Epoxy resin and acrylate ester blend) Alkyl Carbonate, concentration 0–10% by wt; PTMEG, concentration 10–30% by wt; Epoxy Resin, concentration 10–30% by wt; Diacrylate Esters, concentration 0–10% by wt; Acrylate Esters, concentration 0–10% by wt; one or more Photoinitiators having a concentration of approximately 0–30% by wt; Aliphatic Polyol Polyglycidyl Ether, concentration 0–10% by wt; and Cycloaliphatic Epoxide, concentration 30–60% by wt.

(d) For SL5530HT:
(Chemical Family: Epoxy resin and acrylate ester blend) Epoxy Resin, concentration 10–30% by wt; Diacrylate Esters, concentration 0–10% by wt; Acrylate Esters, concentration 0–10% by wt; one or more Photoinitiators having a concentration of approximately 0–20% by wt; and Cycloaliphatic Epoxide, concentration 30–60% by wt.

Figure 3:
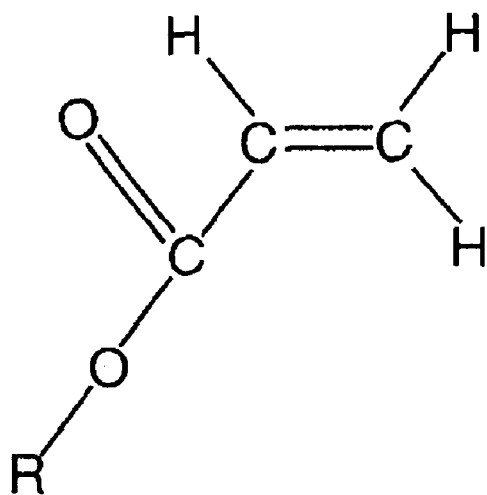
FIG. 3 shows a generalized molecular structure of monofunctional acrylate, epoxy, and vinylether structures.
Figure 3:
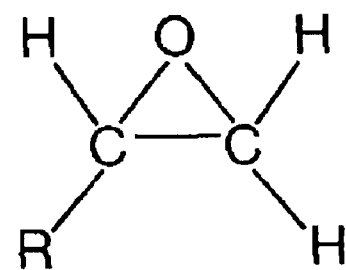
Figure 3:
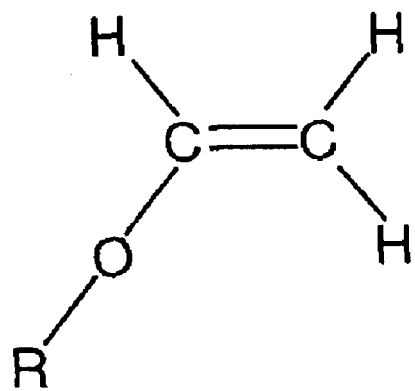

Other epoxy resins formulated may also exhibit the optical properties for enabling the present invention. In particular, a non-exhaustive list of additional resins that may be utilized in practicing the present invention includes: the resin SL5530 (also manufactured by Ciba-Geigy), some types of Acrylate Resins, one or more types of Photopolymers known is a Vinylether Photopolymers may also be utilized with the present invention. FIG. 3 illustrates chemical structures of some of the above-identified resins.

The amount of energy needed to start the photoinitiation (bonding) is known as critical energy or EC. The amount of energy needed to produce visibly shaded models after thermal postcure (i.e., Sub-step B above) may be, as stated above, 0.01% to 500% of EC, and more particularly, 10% to 100% of EC. However, it is believed that even the slightest amount of additional energy above EC (e.g., 0.01% or less) will color/shade an STL model if applied to enough multiple successive layers. This assumes the subsequent step of heating is performed according to the present invention. For notational purposes herein, the amount of radiation higher than the EC that is applied to the resin will be denoted as "x>EC" where x represents the additional amount of energy required to create the optical density desired.

The temperature and time required in a thermal oven can vary according to physical part dimensions as well as the amount of UV overcure. A large model (e.g., a model having a volume size greater than 8 inches square) may take two to four hours for sufficient amount of heat to effectively penetrate to the center of the model. A small model (e.g., a model having a volume size less than 1 inch square) can darken in less than 30 minutes at an appropriate oven temperature. In one embodiment, the heat curing temperature used was 90° C. This temperature was appropriate for the manifestation of model color/shading substantially independent of the model size since the length of model heating time can be appropriately varied. In general, lower model heating temperatures require longer times, and higher temperatures shorter times. If a model according to the present invention is left in the thermal oven for an extended period of time (e.g., four hours or more), darkened (e.g., UV overcured) portions of the model may start to lighten slightly, but never reach their original clarity prior to heating.

Thus, the amount of x>EC put into the resin, the heating temperature, and the duration of the heat applied may each have an effect on the resulting optical density of the solidified resin. Additionally, there are many ways to vary the amount of x>EC applied to a STL model, for example, variations in the following parameters affect the optical density of an STL model. These parameters include the output power of the laser (i.e., more power, in general, the darker), the speed that the laser "draws" on the resin (i.e., moves across the resin surface, wherein the slower the movement the darker), the resin layer thickness (i.e., in general, the thinner the layer darker), and the number of layers (i.e., the more layers, the darker the appearance when the model is viewed perpendicularly to the layers).

Moreover, an analogy may be drawn between at least some of the above-mentioned variables for the present invention and variables related to development of photographic film. In particular, assuming heat exposure time is kept substantially constant, the EC of a resin may be likened to a photographic film speed, the laser power may be likened to lens aperture, and laser draw speed may be likened to shutter speed. Additionally, heat (i.e., temperature) may be likened to the brightness of a scene, such as low heat likened to low light, and high heat likened to bright light.

The optical density of any portion of an STL model colorized/shaded according to the present invention is a function of x>EC (x>critical energy), LP (laser power), LDS (laser draw speed over the model portion), and H (heat; i.e., temperature and duration).

The process of introducing shading to an STL geometry (i.e., model) consists of three basic processes:
(1) UV model overcuring;
(2) Heating the model; and
(3) Converting a grayscale image to a 3-dimensional computer aided design (CAD) data file.

Figure 4:
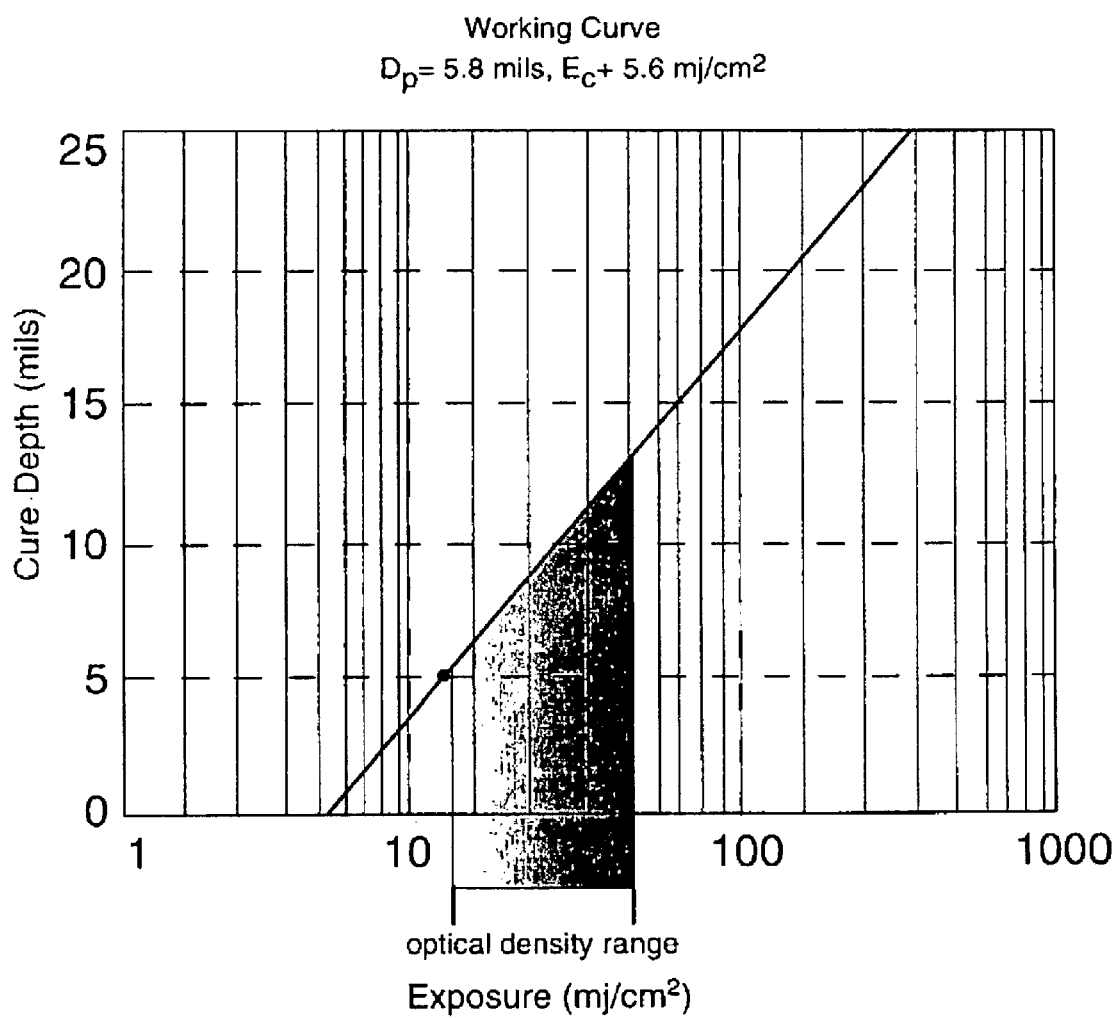
FIGS. 4 and 5 illustrate an STL model having a grayscale shading according to a heightfield method wherein the higher (or thicker) portions of an STL model, the darker the color.

A brief discussion of each of these processes follows:
(1) UV MODEL OVERCURE (i.e., x>EC). The present invention may be practiced by applying laser energy to a resin, such as those identified herein, that exhibit optical density changes when the present invention is practiced. The laser energy is only fractionally more than the laser energy typically used to solidify the resin when an STL model is typically built. For example, whereas the laser energy (i.e., EC) for a typical non-colorized or non-shaded STL model is in the range of approximately 15 megajoules per centimeter squared (mj/cm$^2$) for a resin (for use in practicing the invention) with an EC of 5.6 and a penetration of depth (Dp) of 5.8 and a layer thickness of 0.005 inches, the additional laser energy (i.e., above EC) used by the present invention may be in the range of 16 mj/cm$^2$ to 50 mj/cm$^2$ for a resin with an EC of 5.6 and a Dp of 5.8 and a layer thickness of 0.005 inches as is shown in FIG. 4. Moreover, the amount of UV overcure used is directly related to the optical density of a given portion of the model as it is affected by heat.

Note that as mentioned above, UV overcure without the subsequent application of a heating step may be used to change the optical density of an STL model by burning the resin with a STL laser energy output very much greater than EC (e.g., an energy output in the range of 1000% above EC). However, in the method of the present invention, the desired visual coloring effects may be produced without burning the resin and without the application of large amounts of laser energy above EC. Moreover, as a consequence, STL data files generated in accordance with the present invention can be processed by current STL systems using, for example, standard and/or advanced versions of 3D Lightyear software.

(2) HEAT. A model heating step used by the present invention follows the UV overcuring and induces a desired change in the optical density of the portions of the STL model that have been UV overcured.

Figure 5:
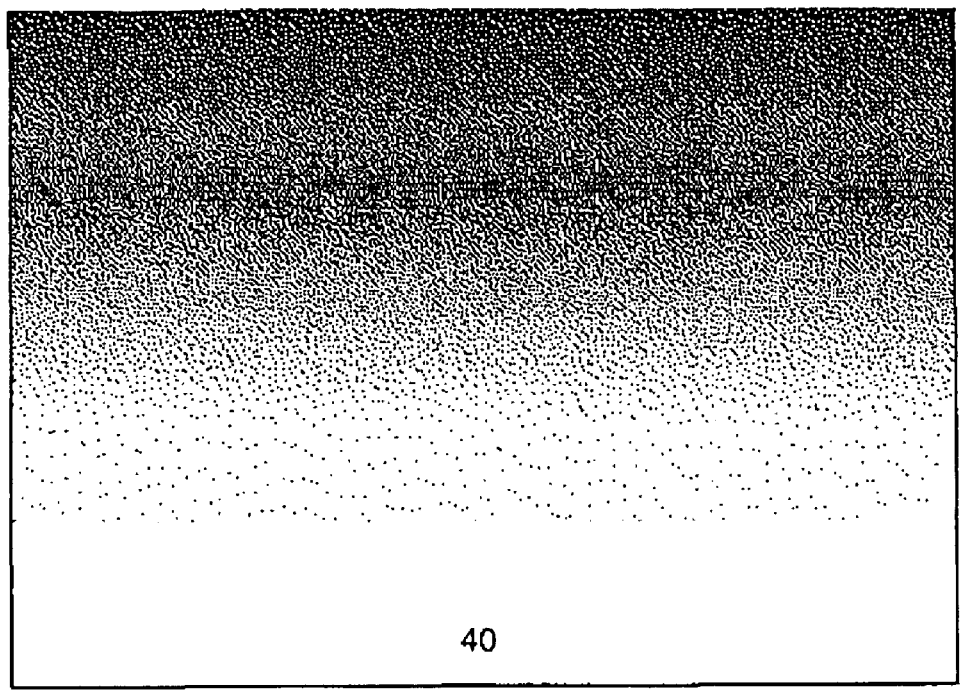
Figure 6:
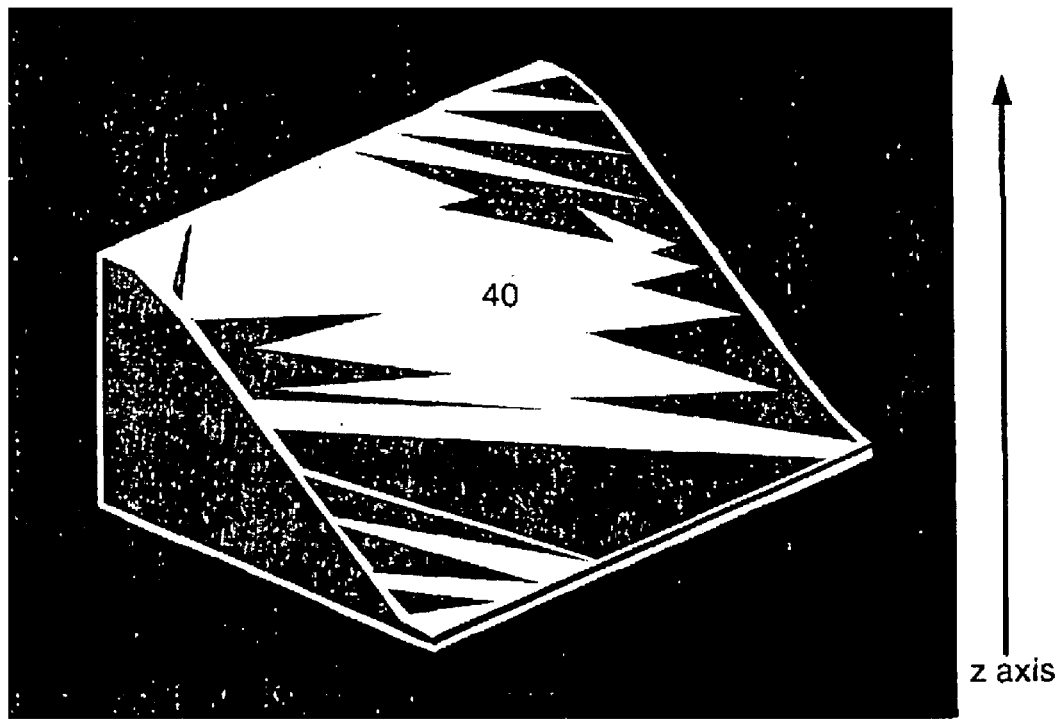
FIGS. 6 and 7 illustrate an STL model having a grayscale shading according to a halftone method wherein shaded "dots" are extruded (in the z axis direction) so that (a) the higher the extrusion of colored resin layers, the darker the color, and (b) denser and larger the extruded dots, the darker the color.
Figure 7:
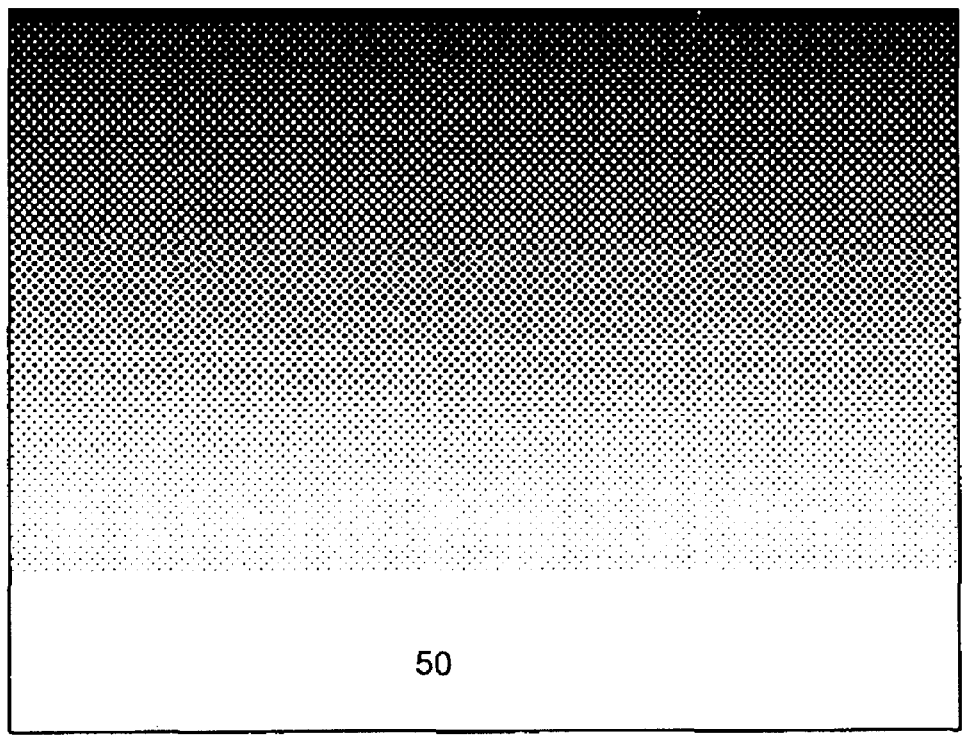
Figure 8:
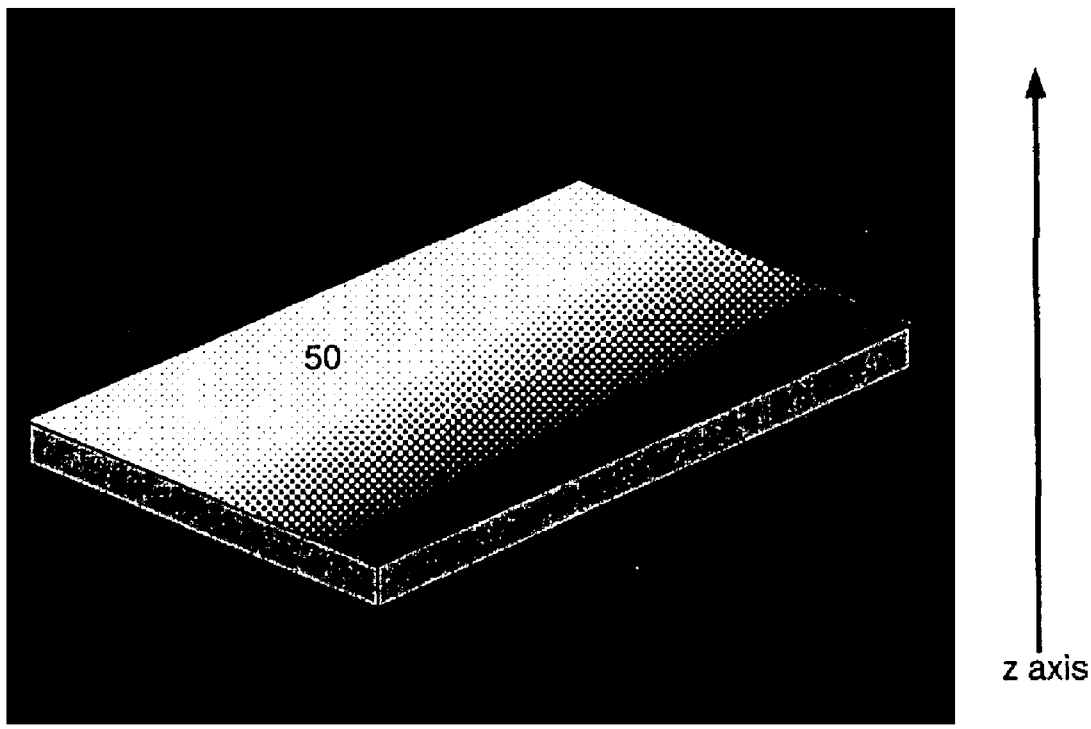
FIGS. 8 and 9 illustrate an STL model having a grayscale shading according to a threshold method wherein from a corresponding photograph for the model, several separate CAD data files are generated, each file representing a specific optical density of the original photograph. One UV overcure value may be given to all the resulting STL files (derived from the CAD files) and the optical density is perceived as a grayscale according to where and how many resin layers obtained from the STL files overlap.
Figure 9:
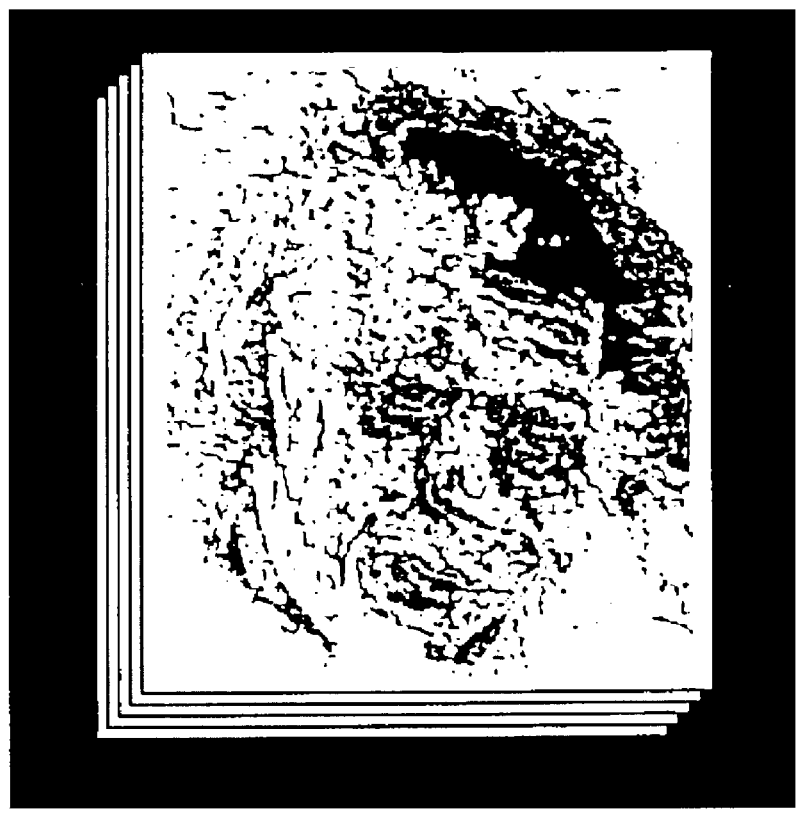
Figure 10:
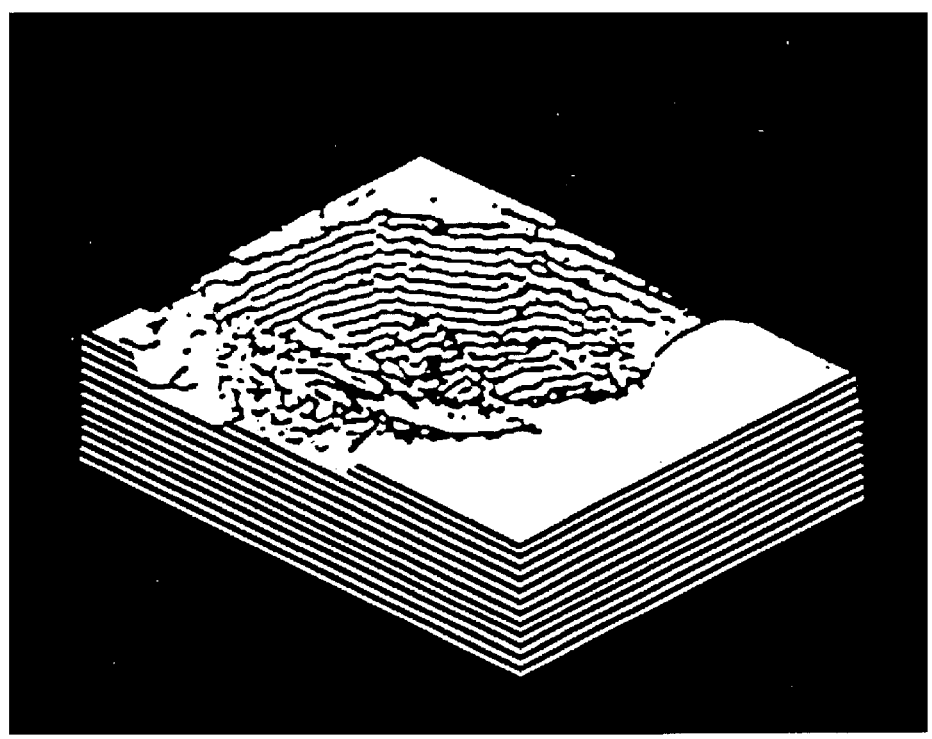
FIG. 10 is a graph showing an example of a "working curve" for a typical resin that may be used in practicing the present invention, wherein this curve indicates the amount of energy (mj/cm$^2$) required to solidify resin layers of varied thickness (i.e., cure depth). Moreover, the shaded grayscale portion of this figure illustrates the shading expected from practicing the present invention as additional energy above the 15 mj/cm$^2$ for solidifying a layer of the resin (the layer having a depth 0.005 inches).

(3) GRAYSCALE IMAGE CONVERSION TO 3D CAD FILE. Once a desired range of optical density is determined and consequently a likely combination of heat and UV overcure is identified (e.g., by performing tests), the remaining task is to convert grayscale or color image data (e.g., a photograph) into a CAD or similar file format that can be then converted to the native format for an STL machine where UV overcure values can be applied. It is within the scope of the present invention that various embodiments may use any one of the following four methods of grayscale image conversions for generating a 3D CAD file format. Moreover, as one skilled in the art will appreciate, other such grayscale image conversion to 3D CAD file may be used.

a.) Heightfield generated. This method involves extruding a photograph according to the grayscale values contained in the image. The darkest portions of the photograph would become the tallest, and the lightest or white portions would become the shortest. One overcure value is given to the entire object (or part or file), and the optical density is perceived as grayscale according the thickness of the various areas of the CAD file. An illustrative example of a simple model resulting from this technique is provided in FIGS. 5 and 6, wherein FIG. 5 illustrates an STL model having substantially the same shading on each layer (built one on top of the other in the z axis direction) for thereby providing a substantially continuous grayscale when the face 40 is viewed face on as in FIG. 6.

b.) Halftone generated. This method involves converting the original photograph into a halftone image, similar to the way newsprint is generated, then extruding the halftone image into a CAD file. One overcure value is given to the entire part and the optical density is perceived as grayscale according to the size of halftone circles generated. An illustrative example of a simple model resulting from this technique is provided in FIGS. 7 and 8. FIG. 7 illustrates an STL model in a perspective view having shaded "dots" that are extruded (in the z axis direction), wherein (a) the higher the extrusion of colored resin layers, the darker the color, and (b) denser and larger the extruded dots, the darker the color. Accordingly, a substantially continuous grayscale may be provided wherein the face 50 is viewed face on as in FIG. 8.

c.) Threshold generated. This method involves converting the photograph into several separate CAD files, each representing a specific optical density of the original photograph. One UV overcure value is given to all the resulting STL files (derived from the CAD files) and the optical density is perceived as grayscale according to where and how many resin layers obtained from the STL files overlap. An illustrative example of an STL model resulting from this technique is provided in FIGS. 9 and 10. FIG. 9 illustrates the STL model in a perspective view and FIG. 10 illustrates top view of the STL model that is substantially perpendicular to the layering of the model. Due to the lighting used in generating FIGS. 9 and 10, the grayscaling shown is substantially inverted. Thus, the darkest areas should be the lightest and visa versa.

d.) Overcure variation generated. This method involves changing the amount of overcure used according to the optical density of the original photograph. This can be done by multiple scans or changing the scanning speed during layer drawing. Note that the present method of grayscale image conversion may be considered as an enhancement of Step 2 instead of Step 1.

It should be noted that a wide range of optical density from barely perceptual to completely opaque can be achieved with all four of the above grayscale conversion methods.

In one embodiment, a photograph may be converted to a CAD file format and then to a STL file format by any method outlined above. The photographic STL data file may be then included with a "donor" STL file (e.g., having the geometry or part upon which the photographic image is to be reproduced). Accordingly, additional overcure values can be assigned to the photographic portion of the resulting STL file. Thus, by UV overcuring and subsequently heating according to the present invention, the photographic image can be reproduced in or on the STL model.

The following is an excerpt from the book: "STEREO LITHOGRAPHY AND OTHER RP&M TECHNOLOGIES" by Paul F Jacobs PhD, ASME book No. 800431, published by The Society of Manufacturing Engineers, Dearborn, Mich. This excerpt from this book provides additional background for the present invention.

"SL resin photospeed is directly associated with the amount of laser exposure necessary to achieve a prescribed cure depth, Cd. SL photopolymer photosensitivity, which is often used interchangeably with the term "photospeed," also implies wavelength sensitivity. Nonetheless, the impact of the resin photospeed on the time required to build a part is the most relevant property for SLA users. The primary resin photosensitivity parameters (i.e., the penetration depth, Dp, and the critical exposure, Ec), are certainly not intuitively obvious quantities. However, the resin parameters can be directly associated with the much more physically significant and intuitively obvious "laser beam scan velocity," Vs, at the free liquid resin surface, necessary to generate a specific cure depth Cd . . .

"The photosensitivity of SL resins is established using the WINDOWPANE™ procedure, which involves exposing the resin to a laser beam scanned at a prescribed series of different velocities. The resulting CD values are then plotted as a function of the logarithm of the laser exposure, Emax. The dependence of cure depth as a function of exposure is called the "resin working curve" and is generally log-linear. This log-linear response to actinic radiation is one of the most fundamental SL photopolymer characteristics . . .

"The slope of the working curve is Dp and the X-intercept is Ec. The latter corresponds to the gel point of the photopolymer. These are the fundamental parameters that define the photosensitivity of an SL resin when exposed to an actinic laser radiation source. Neither Dp nor Ec alone define the photospeed, but both parameters collectively define the generated cure depth, Cd, according to the fundamental working curve equation, $$Cd = Dp\ Ln(Emax/Ec) \ldots$$

"Estimating the actual laser scan velocity, Vs, required to achieve a given Cd from the values of Dp and Ec for a specific resin, is not intuitive at all, owing to the logarithmic exposure dependence. The photospeed is often erroneously quoted to be a simple function of Ec only. In reality, it is a function that must be defined by both Dp and Ec."

The advantages of the present invention are to improve the communication of a concept. For example, to capture with exceptional detail any object or body, living or inorganic of any original size from micro/macrobiotic to solar magnitude and having structure internally or externally distinguishable by sound, radio, light, x-ray, magnetic, or other waveform and reproduce the body or object in the visible spectrum of light and in a physical dimension such that such detail can been seen with the naked eye. Some examples are 3D micrographic representations of single cell and atomic nuclei, 3D terrestrial topographical mapping of gaseous planet or star surfaces, 3D X-rays, medical models, 3D DNA maps, 3D scientific or mathematical data representation, display panel and instrument prototypes, manufacturing prototypes, as well as artistic models.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for providing color to a stereolithographically produced model, comprising:

obtaining data representing said model, wherein said data is readable by a stereolithographic model generating machine for solidifying layers of a liquid resin in a vat creating resin layers to create successive cross sections of said model;

exposing each of said resin layers with energy effective for solidifying said resin;

overexposing one or more portions of at least one of said resin layers according to a coloring or shading indicated in said data creating one or more overexposed portions;

heating said model with an effective amount of heat to induce a color or shading change in substantially only said one or more overexposed portions of said model;

removing said model from said vat and cleaning said model;

exposing said model to an energy source; and finishing said model.

2. The method of claim 1, wherein said energy effective for solidifying said resin is a laser.

3. The method of claim 1, wherein said solidifying said resins is by means of actinic radiation.

4. The method of claim 1, wherein said energy source is an ultraviolet oven utilizing ultraviolet light.

5. The method of claim 4, wherein said exposing said model to an energy source further hardens said model.

6. The method of claim 1, wherein said overexposing said resin layers is with laser radiation.

7. The method of claim 1, wherein said overexposing said resin layers is with ultraviolet light.

8. A method for providing color to a stereolithographically produced model comprising:

solidifying layers of a liquid resin in a vat creating resin layers to create successive cross sections of said model;

exposing said resin layers with energy effective for solidifying said resin;

overexposing one or more portions of at least one of said resin layers according to a coloring or shading indicated in said data creating one or more overexposed portions; and heating said model with an effective amount of heat to induce a color or shading change in substantially only said one or more overexposed portions of said model.

9. The method of claim 8, wherein said energy effective for solidifying said resin is a laser.

10. The method of claim 8, wherein said solidifying said resins is by means of actinic radiation.

11. The method of claim 8, wherein said overexposing said resin layers is with laser radiation.

12. The method of claim 8, wherein said overexposing said resin layers is with ultraviolet light.

13. The method of claim 8, further comprising removing said model from said vat and cleaning said model.

14. The method of claim 8, further comprising exposing said model to an energy source.

15. The method of claim 14, wherein said energy source is an ultraviolet oven utilizing ultraviolet light.

16. The method of claim 14, wherein said exposing said model to an energy source further hardens said model.

17. The method of claim 8, further comprising finishing said model.

18. A method for providing color to a stereolithographically produced model, comprising:

obtaining data representing said model, wherein said data is readable by a stereolithographic model generating machine for solidifying layers of a liquid resin in a vat creating resin layers to create successive cross sections of said model;

exposing each of said resin layers with energy effective for solidifying said resin;

overexposing one or more portions of at least one of said layers according to a coloring or shading indicated in said data creating one or more overexposed portions;

heating said model with an effective amount of heat to induce a color or shading change in substantially only said one or more overexposed portions of said model;

removing said model from said vat and cleaning said model; and exposing said model to an energy source.

19. The method of claim 18, wherein said energy effective for solidifying said resin is a laser.

20. The method of claim 18, wherein said solidifying said resins is by means of actinic radiation.

21. The method of claim 18, wherein said energy source is an ultraviolet oven utilizing ultraviolet light.

22. The method of claim 18, wherein said exposing said model to an energy source further hardens said model.

23. The method of claim 18, wherein said overexposing said resin layers is with laser radiation.

24. The method of claim 18, wherein said overexposing said resin layers is with ultraviolet light.

25. The method of claim 18, further comprising finishing said model.

26. A method for providing color to a stereolithographically produced model, comprising:

obtaining data representing said model, wherein said data is readable by a stereolithographic model generating machine for solidifying layers of a liquid resin in a vat creating resin layers to create successive cross sections of said model;

exposing each of said resin layers with energy effective for solidifying said resin;

overexposing one or more portions of at least one of said layers according to a coloring or shading indicated in said data creating one or more overexposed portions; and heating said model with an effective amount of heat to induce a color or shading change in substantially only said one or more overexposed portions of said model.

27. The method of claim 26, wherein said energy effective for solidifying said resin is a laser.

28. The method of claim 26, wherein said solidifying said resins is by means of actinic radiation.

29. The method of claim 26, wherein said overexposing said resin layers is with laser radiation.

30. The method of claim 26, wherein said overexposing said resin layers is with ultraviolet light.

31. The method of claim 26, further comprising removing said model from said vat and cleaning said model.

32. The method of claim 26, further comprising exposing said model to an energy source.

33. The method of claim 32, wherein said energy source is an ultraviolet oven utilizing ultraviolet light.

34. The method of claim 32, wherein said exposing said model to an energy source further hardens said model.

35. The method of claim 26, further comprising finishing said model.

36. A method for providing color to a stereolithographically produced model, comprising:

obtaining data representing said model, wherein said data is readable by a stereolithographic model generating machine for solidifying layers of a liquid resin in a vat creating resin layers to create successive cross sections of said model;

exposing each of said resin layers with energy effective for solidifying said resin;

overexposing one or more portions of at least one of said layers according to a coloring or shading indicated in said data creating one or more overexposed portions;

removing said model from said vat and cleaning said model; and exposing said model to an energy source.

37. The method of claim 36, wherein said energy effective for solidifying said resin is a laser.

38. The method of claim 36, wherein said solidifying said resins is by means of actinic radiation.

39. The method of claim 36, wherein said energy source is an ultraviolet oven utilizing ultraviolet light.

40. The method of claim 36, wherein said exposing said model to an energy source further hardens said model.

41. The method of claim 36, further comprising overexposing one or more portions of at least one of said layers according to a coloring or shading indicated in said data.

42. The method of claim 36, wherein said overexposing said resin layers is with laser radiation.

43. The method of claim 36, further comprising heating said model with an effective amount of heat to induce a color or shading change in substantially only said one or more overexposed portions of said model.

44. The method of claim 36, further comprising finishing said model.

* * * * *